United States Patent
Koga et al.

(10) Patent No.: US 7,169,221 B2
(45) Date of Patent: Jan. 30, 2007

(54) WATER BASE INK FOR INK-JET RECORDING

(75) Inventors: Narumi Koga, Nagoya (JP); Masaya Fujioka, Nagoya (JP); Kazuma Goto, Nagoya (JP); Junichiro Sugimoto, Aichi-gun (JP); Satoshi Okuda, Nagoya (JP); Shunichi Higashiyama, Yotsukaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 11/149,155

(22) Filed: Jun. 10, 2005

(65) Prior Publication Data

US 2005/0279251 A1    Dec. 22, 2005

(30) Foreign Application Priority Data

Jun. 18, 2004   (JP) ............................ 2004-181581

(51) Int. Cl.
   *C09D 11/02* (2006.01)
(52) U.S. Cl. ................... 106/31.58; 106/31.59
(58) Field of Classification Search ............. 106/31.58, 106/31.59
   See application file for complete search history.

(56) References Cited

U.S. PATENT DOCUMENTS 5,560,771 A    10/1996  Takemoto et al.
6,482,256 B1 *  11/2002  Kanaya et al. ........... 106/31.51
6,712,462 B2    3/2004  Ito et al.
2003/0150354 A1  8/2003  Ito ........................... 106/31.27
2004/0183874 A1 *  9/2004  Toyoda et al. ................ 347/86

FOREIGN PATENT DOCUMENTS

| EP | 0 738 767 A1 | 10/1996 |
| EP | 0 985 716 A1 | 3/2000 |
| EP | 1 384 762 A1 | 1/2004 |
| EP | 1 533 345 A1 | 5/2005 |
| JP | B2 3089665 | 7/2000 |
| WO | WO 2004/007620 A1 | 1/2004 |

* cited by examiner

*Primary Examiner*—Helene Klemanski
(74) *Attorney, Agent, or Firm*—Oliff & Berridge, PLC

(57) ABSTRACT

A water base ink for ink-jet recording contains 0.1% by weight to 4.0% by weight of C.I. Direct Yellow 132; not less than 0.5% by weight of glycol ether having a melting point of not more than −45°C.; and a water-soluble organic solvent in which a solubility of C.I. Direct Yellow 132 at 20° C. is not less than 5%. The ink satisfies $0.2 \leq B/A$ and $3 \leq C/A$. B/A represents a weight ratio of the glycol ether to the C.I. Direct Yellow 132 contained in the ink, and C/A represents a weight ratio of the water-soluble organic solvent to the C.I. Direct Yellow 132 contained in the ink. The stability in long-term storage after the evaporation of water or at low temperatures can be obtained even when C.I. Direct Yellow 132 is used in the water-base ink for the ink-jet recording.

12 Claims, No Drawings

WATER BASE INK FOR INK-JET RECORDING

BACKGROUND OF THE INVENTION

1. Field of the Invention

The present invention relates to a water base ink for ink-jet recording.

2. Description of the Related Art

In the ink-jet printing system, ink droplets are formed by the ink discharge system including, for example, the electrostatic attraction system, the system in which mechanical vibration or displacement is applied to the ink by using a piezoelectric element or the like, and the system in which bubbles are generated by heating the ink to utilize the pressure generated thereby. All or a part of the ink droplets are adhered to a recording objective material such as paper to perform the printing.

As the ink used for such an ink-jet recording system, a water base ink is used in which various kinds of dyes or pigments are dissolved or dispersed in a liquid medium composed of water or composed of water and water-soluble organic solvent.

In the ink-jet recording system, in order to obtain a recorded image which is satisfactory for a long period of time, there are demands such as (1) the physical property values of the ink (viscosity, surface tension, and density) are appropriate values; (2) neither any appearance of deposit due to the heat occurs or any change in the physical property values is caused, so that the clog-up in a nozzle or orifice of the recording apparatus is prevented and the discharge stability is obtained; and (3) the recorded image is excellent in water resistance and light resistance or the like. In addition, it is demanded that (4) the nozzle diameter of a recording head of an ink-jet printer is decreased to make a minute ink droplet discharged from the nozzle in order to realize satisfactory printing property showing no blurring of the ink even on a regular paper without using an exclusive ink-jet paper.

However, when the nozzle diameter of the recording head is decreased, there is the following problem. Namely, when an ink-jet printer is left to stand for a long period of time with an ink cartridge attached thereto, foreign matters are generated in, or enter into, a nozzle of the head or a narrow ink channel inside the head, which in turn prevents an ink from smoothly passing through the nozzle of the head or the ink channel, thereby causing a discharge failure. This problem most likely occurs to Color Index Number (C.I.) Direct Yellow 132 used as the coloring agent in the ink. C. I. Direct Yellow 132 is preferred dye for the yellow ink because it is excellent in the color vividness and brightness.

In order to solve the problem, it has been proposed to add a large amount of a humectant so as to prevent the deposition of dye due to the evaporation of water or low temperatures, or to use benzotriazole so as to suppress the change in the physical properties of the ink (U.S. Pat. No. 5,560,771 corresponding to Japanese Patent No. 3089665).

Example A of U.S. Pat. No. 5,560,771 discloses a yellow ink in which C.I. Direct Yellow 132 is used as the dye and which contains diethylene glycol. However, this ink is different from the ink of the present invention in composition and components.

However, in a conventional water base ink for ink-jet recording, the method of adding a large amount of humectant involves inconveniences in which the viscosity of the ink is increased and thus any optimal viscosity cannot be obtained. In addition, there is the following problem. The surroundings of a nozzle of an ink head is be dried more quickly under the hot and dry environment. When the dye is deposited from the ink attached to the surrounding of nozzle, it is hard to remove the deposited dye. In particular, this problem is serious in the high-temperature areas. Although the ink-jet printer of recent model is provided with a wiper for wiping the surface of the head, once the dye is deposited and solidified, it cannot be removed with the wiper. In addition, during transportation of an ink cartridge, for example, by air, or in use of the ink cartridge in a cold region, the ink is exposed to a low-temperature environment and thus the dye may be deposited. With the conventional method, it is difficult to simultaneously prevent the deposition of dye after the evaporation of water and the deposition of dye at low temperatures. Namely, there is a problem that even when it is possible to prevent the deposition of the dye after the evaporation of water, it is difficult to prevent the deposition of the dye under the low temperatures. Or, on the contrary, even when it is possible to suppress the deposition of the dye under the low temperatures, it is difficult to prevent the deposition of the dye after the evaporation of water. In particular, in the inks using C.I. Direct Yellow 132 as the dye, the foregoing problem has not been solved as far as the inventors are aware of.

The present invention has been made in order to solve the above problems, an object of which is to provide a water base ink for ink-jet recording using C.I. Direct Yellow 132 in which any foreign matters such as deposition of dye does not occur and the stability in long-term storage is obtained.

SUMMARY OF THE INVENTION

The inventors have discovered that in a water base ink for ink-jet recording using C.I. Direct Yellow 132, the above object can be achieved by using a special combination of a specific water-soluble organic solvent and a specific glycol ether and by adjusting a weight ratio of the water-soluble organic solvent to C.I. Direct Yellow 132 and a weight ratio of the glycol ether to C.I. Direct Yellow 132 within a specific range, respectively.

According to the present invention, there is provided a water base ink for ink-jet recording comprising:

C.I. Direct Yellow 132 in an amount of 0.1% by weight to 4.0% by weight;

glycol ether having a melting point of not more than −45° C. in an amount of not less than 0.5% by weight; and a water-soluble organic solvent in which a solubility of the C.I. Direct Yellow 132 at 20° C. is not less than 5%, wherein the ink satisfies the following formulae:

$$0.2 \leq B/A, \; 3 \leq C/A$$

in which B/A represents a weight ratio of the glycol ether to the C.I. Direct Yellow 132 contained in the ink, and C/A represents a weight ratio of the water-soluble organic solvent to the C.I. Direct Yellow 132 contained in the ink.

Since the ink contains the glycol ether having a melting point of not more than −45° C. by a predetermined ratio to the C.I. Direct Yellow 132, it is possible to lower the melting point of the ink and to prevent the deposition of C.I. Direction Yellow 132 at low temperature.

Further, since the ink contains the water-soluble organic solvent in which the solubility of the C. I. Direct Yellow 132 at 20° C. is not less than 5%, it is possible to prevent the occurrence of deposition of the dye when water is evaporated.

Thus, according to the present invention, it is possible to use C.I. Direct Yellow 132, as the coloring agent for the water base ink for ink-jet recording, which is excellent in color reproduction performance and color vividness or brightness in an image recorded with the ink-jet recording system, regardless of the environment or change of the environment in which the ink-jet recording apparatus is used. In particular, the ink of the present invention is capable of avoiding the problem of dye deposition without using a specific moistening agent or benzotriazole.

DESCRIPTION OF THE PREFERRED EMBODIMENTS

The present invention will be explained in further detail below.

The water base ink for ink-jet recording of the present invention uses C.I. Direct Yellow 132 as coloring agent.

In the present invention, C.I. Direct Yellow 132 may be used as the coloring agent singly, or may be used with other coloring agent or agents in a mixed manner.

The dye or dyes used with C.I. Direct Yellow 132 in a mixed manner may include, for example, a water-soluble dye represented by direct dye, acid dye, basic dye and reactive dye or the like. In particular, the dyes as the yellow dye, which are preferred in view of the ink characteristics such as the vividness, the water-solubility, the stability, and the light resistance, include, for example, C. I. Direct Yellow 12, 24, 26, 44, 86, 98, 142; and C. I. Acid Yellow 11, 17, 23, 25, 29, 42, 61, 71. A plurality of these dyes may be used in a mixed manner.

As the dye or dyes other than the yellow dye includes, for example, C. I. Direct Black 17, 19, 32, 51, 71, 108, 146, 154, 168; C. I. Direct Blue 6, 22, 25, 71, 86, 90, 106, 199; C. I. Direct Red 1, 4, 17, 28, 83, 227; C. I. Direct Orange 34, 39, 44, 46, 60; C. I. Direct Violet 47, 48; C. I. Direct Brown 109; C. I. Direct Green 59; C. I. Acid Black 2, 7, 24, 26, 31, 52, 63, 112, 118; C. I. Acid Blue 9, 22, 40, 59, 93, 102, 104, 113, 117, 120, 167, 229, 234; C. I. Acid Red 1, 6, 32, 37, 51, 52, 80, 85, 87, 92, 94, 115, 181, 256, 289, 315, 317; C. I. Acid Orange 7, 19; C. I. Acid Violet 49; C. I. Basic Black 2; C. I. Basic Blue 1, 3, 5, 7, 9, 24, 25, 26, 28, 29; C. I. Basic Red 1, 2, 9, 12, 13, 14, 37; C. I. Basic Violet 7, 14, 27; and C. I. Food Black 1, 2. A plurality of these dyes may be used in a mixed manner.

With respect to a content of the dye in the water base ink for ink-jet recording of the present invention, C.I. Direct Yellow 132 is contained in an amount of 0.1 to 4% by weight in view of obtaining an appropriate density of the image and preventing the deposition. In addition, a total amount of C.I. Direct Yellow 132 and other coloring agent or agents is preferably 0.1 to 20% by weight.

The water base ink of the present invention contains the glycol ether having a melting point of not more than −45° C. and the water-soluble organic solvent in which a solubility of the C.I. Direct Yellow 132 at 20° C. is not less than 5%.

Such the glycol ether shows a melting point of not more than −45° C. singly which is a very low melting point. Accordingly, the glycol ether, when added in the ink, has the functions to lower the melting point of the ink and to prevent the low-temperature deposition of C.I. Direct Yellow 132 as the dye contained in the ink.

The solubility of C.I. Direct Yellow 132 with respect to the glycol ether having a melting point of not more than −45° C. is preferably as high as possible.

The glycol ether having a melting point of not more than −45° C. includes, for example, ethylene glycol monomethyl ether, diethylene glycol monomethyl ether, polyethylene glycol monomethyl ether, ethylene glycol monoisopropyl ether, ethylene glycol monobutyl ether, diethylene glycol monobutyl ether, triethylene glycol monobutyl ether, ethylene glycol monoisobutyl ether, diethylene glycol monoisobutyl ether, ethylene glycol monohexyl ether, ethylene glycol mono-2-ethylhexyl ether, diethylene glycol mono-2-ethylhexyl ether, ethylene glycol monoallyl ether, ethylene glycol monobenzyl ether, diethylene glycol monobenzyl ether, propylene glycol monomethyl ether, dipropylene glycol monomethyl ether, tripropylene glycol monomethyl ether, propylene glycol monopropyl ether, dipropylene glycol monopropyl ether, propylene glycol monobutyl ether, dipropylene glycol monobutyl ether, tripropylene glycol monobutyl ether, ethylene glycol dimethyl ether, diethylene glycol dimethyl ether, triethylene glycol dimethyl ether, diethylene glycol dibutyl ether, dipropylene glycol dimethyl ether. These may be used singly or a plurality of these may be used in a mixed manner.

The content of the glycol ether having a melting point of not more than −45° C. is an amount which is not less than 0.5% by weight with respect to the total amount of the ink and which satisfies following formula: $0.2 \leq B/A$.

In the formula, B/A represents a weight ratio of the glycol ether to the C.I. Direct Yellow 132 contained in the ink. If the content of the glycol ether having a melting point of not more than −45° C. is less than 0.5% by weight or if the B/A is less than 0.2, it is not possible to sufficiently lower the melting point of the ink, and it is not possible to sufficiently prevent the low-temperature deposition of the C.I. Direct Yellow 132. In order to ensure that the melting point of the ink is sufficiently lowered, B/A is preferably not less than 0.3. The content of glycol ether with respect to the total amount of the ink is preferably not more than 10% by weight in view of suppressing the bleeding between the ink of the present invention and a black ink. In addition, also by making the value of B/A to be not more than 5, it is possible to suppress the bleeding between the ink of the present invention and a black ink.

The water-soluble organic solvent used in the present invention is the water-soluble organic solvent in which C.I. Direct Yellow 132 can be sufficiently dissolved at 20° C. The inventors consider that when the solubility of C.I. Direct Yellow 132 at 20° C. is at least about 5%, the object of the present invention is achieved. The water-soluble organic solvent, in which the solubility of C.I. Direct Yellow 132 at 20° C. is not less than 5%, dissolves C.I. Direct Yellow 132 therein with high solubility. Accordingly, by having this water-soluble organic solvent contained in the ink, there is an effect to prevent the deposition of C.I. Direct Yellow 132 when the water in the ink is evaporated.

As the water-soluble organic solvent in which the solubility of C.I. Direct Yellow 132 at 20° C. is not less than 5%, a water-soluble organic solvent in which a solubility of C.I. Direct Yellow 132 also at −20° C. is not less than 5% is desired in view of preventing the low-temperature deposition of C.I. Direct Yellow 132.

The water-soluble organic solvent in which the solubility of C.I. Direct Yellow 132 at 20° C. is not less than 5% includes, for example, 2-pyrrolidone and polyethylene glycol #400. Further, the water-soluble organic solvent in which the solubility of C.I. Direct Yellow 132 at 20° C. and also at −20° C. is not less than 5% includes, for example, diethylene glycol, triethylene glycol, polyethylene glycol #200, propylene glycol, dipropylene glycol, tripropylene glycol, 1,2,6-hexanetriol, N-methyl-2-pyrrolidone and triethanolamine. These can be used singly, or a mixture of any combination thereof.

The solubility of the C.I. Direct Yellow 132 with respect to water-soluble organic solvents can be determined by conducting a test in which C.I. Direct Yellow 132 is made to dissolved in each of the water-soluble organic solvents by agitation or the like.

The water-soluble organic solvent in which the solubility of C.I. Direct Yellow 132 at 20° C. is not less than 5% is contained in the ink by a ratio, to the total amount of ink, which satisfies the following formula: $3 \leq C/A$.

In the formula, C/A represents a weight ratio of the water-soluble organic solvent, in which the solubility of C.I. Direct Yellow 132 at 20° C. is not less than 5%, to the C.I. Direct Yellow 132 contained in the ink. If C/A is less than 3, there is a possibility that the sufficient solubility of C.I. Direct Yellow 132 cannot be maintained when the water is evaporated, and thus the deposition may occur. In order to ensure that the deposition of the C.I. Direct Yellow 132 is suppressed, C/A is preferably not less than 4. The content of the water-soluble organic solvent with respect to the total amount of the ink is preferably not more than 40% by weight in view of suppressing the bleeding between the ink of the present invention and a black ink. In addition, also by making the value of C/A to be not more than 60, particularly not more than 55, it is possible to suppress the bleeding between the ink of the present invention and a black ink.

In the water base ink for ink-jet recording of the present invention, other water base solvent may be used as necessary, in addition to the above-described glycol ether having a melting point of not more than −45° C. and the above-described water soluble organic solvent in which the solubility of C.I. Direct Yellow 132 at 20° C. is not less than 5%.

Further, in the water base ink for ink-jet recording of the present invention, a surfactant is preferably added in order to improve the performance of initial introduction, i.e. in order to smoothly introduce the ink into a narrow ink channel inside the head of the ink-jet printer.

As the surfactant, alkyl ether sulfuric acid ester salt may be used. In particular, it is preferable to use the compound represented by the following formula (1):

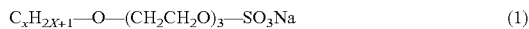

$$C_xH_{2x+1}-O-(CH_2CH_2O)_3-SO_3Na \quad (1)$$

in which x is 12 or 13.

By adding the surfactant represented by the formula (1), the wettability of the ink with respect to the head of the ink-jet printer is enhanced. Accordingly, when the ink is introduced inside the head of the ink-jet printer and even a foreign matter is generated in or enters into the head, it is possible to quickly remove the foreign matter from the head. Thus, the foreign matter does not remain in the head and the cause of clog-up is eliminated.

The surfactant represented by the formula (1) includes, for example, surfactants commercially available such as EMAL 20C (product name produced by Kao Corporation), SANDED END (produce name produced by Sanyo Chemical Industries, Ltd.) and SUNNOL DL1430 (product name produced by Lion Corporation).

The usage amount of the surfactant represented by the formula (1) is preferably 0.01 to 5% by weight, more preferably 0.01 to 2% by weight. If the amount is less than 0.01% by weight, it is not possible to sufficiently increase the wettability of the ink with respect to the head of ink-jet printer. Accordingly, the effect to increase the performance of initial introduction of the ink is hardly obtained. If the amount exceeds 5% by weight, the ink wets the surroundings of the nozzle of the head of ink-jet printer in a non-uniform manner, thereby making it difficult to realize the stable ink discharge.

The water base ink for ink-jet recording of the present invention contains water. As the water, it is preferable to use water with high purity such as ion-exchange water and distilled water.

The content of the water in the ink is preferably 10 to 98% by weight with respect to the total amount of the ink, and more preferably 30 to 97% by weight, much more preferably 40 to 95% by weight.

In addition, in the water base ink for ink-jet recording of the present invention, a viscosity-adjusting agent may be added as necessary. As the viscosity-adjusting agent, for example, glycerol may be used. The content of the viscosity-adjusting agent such as, for example, glycerol, is preferably 5 to 30% by weight with respect to the total amount of the ink. Accordingly, it is possible to easily adjust the viscosity of the ink to be 2 to 5 mPa·s (20° C.) in accordance with the discharge mechanism of the ink-jet printer. The viscosity is a value measured with a double-cylindrical rotation viscometer under the condition of 20° C. and 60 rpm.

Further, the water base ink for ink-jet recording of the present invention may be added with conventionally known additives such as various kinds of dispersants, surface tension-adjusting agents, pH-adjusting agents, and antiseptic/fungicidal agents, as necessary.

The present invention will be specifically explained in further detail below as exemplified by Examples.

EXAMPLE 1–9 COMPARATIVE EXAMPLES 1–7

Inks having the compositions as indicated in Tables 1 and 2, respectively, were prepared. In the tables, the numerical values represent the unit of "% by weight". In the tables, "(B)" represents a glycol ether having a melting point of not more than −45° C.; "(C)" represents a water-soluble organic solvent in which a solubility of C.I. Direct Yellow 132 at 20° C. is not less than 5%; "B/A" represents the ratio of an added amount of the glycol ether having a melting point of not more than −45° C. to an added amount of C.I. Direct Yellow 132; and "C/A" represents a ratio of an added amount of the water-soluble organic solvent in which the solubility of C.I. Direct Yellow 132 at 20° C. is not less than 5% to an added amount of C.I. Direct Yellow 132. As the surfactant represented by the formula (1), a mixture of a surfactant in which x is 12 and a surfactant in which x is 13 was used.

The solubility of C.I. Direct Yellow 132 with respect to each of the water-base organic solvents used in the Examples are as follows:

diethylene glycol: not less than 20% triethylene glycol: not less than 5% polyethylene glycol #200: not less than 10%

N-methyl-2-pyrrolidone: not less than 5%

The solubility of C.I. Direct Yellow 132 with respect to glycerol is about 0.5%.

In Comparative Example 5 (Table 2), the following surfactant was used as the surfactant represented by the following formula (2):

$$R-O-(CH_2CH_2O)_{12}-H \quad (2)$$

in which R is an alkyl group in which C is 14 or 15.

EVALUATION

The inks obtained in Examples and Comparative Examples, respectively, were evaluated for (1) Dye deposition test after evaporation test, (2) Dye deposition test after preservation at low-temperature, (3) Initial introduction test, and (4) Bleeding as follows. The test results are shown in Tables 1 and 2.

(1) Dye Deposition Test After Evaporation Test

Each of the obtained inks was collected in a glass container (24 ml volumne) in an amount of about 10 g. The inks were left to stand in the respective containers, while the containers were open, for a period of not less than 3 days in an environment in which the temperature was 60° C. and the humidity was 40%. After the water was nearly completely evaporated (until the change in weight of the ink disappears), each of the inks was left to stand at an ordinary temperature (approximately 20° C.) for a period of not less than one week. The evaluation was made based on the state of the liquid after the evaporation in accordance with the following criteria:

++: No solid matter (dye) was generated at all in the ink liquid after the water had been evaporated;

+: Very little solid matter (dye) was generated in the ink liquid after the water had been evaporated;

±: Precipitate of the solid matter (dye) was generated in a small amount in the ink liquid after the water had been evaporated; and −: Precipitate of the solid matter (dye) was generated in a large amount in the ink liquid after the water had been evaporated.

(2) Dye Deposition Test After Preservation at Low Temperature

Each of the obtained inks was collected in a glass container (170 ml volumne) in an amount of about 100 g. The containers containing the respective inks were closed and left to stand in a thermostatic chamber of −20° C. After one week, the containers were pulled out of the thermostatic chamber and placed in an environment of ordinary temperature (20° C.). The observation was made as to how the respective inks melted. The evaluation was made based on the observation result in accordance with the following criteria:

++: No solid matter (dye) was generated at all in the bottom of glass container immediately after the ink had melted;

+: Very little solid matter (dye) was generated in the bottom of glass container immediately after the ink had melted;

±: Solid matter (dye) was generated in a small amount in the bottom of glass container immediately after the ink had melted; and −: Solid matter (dye) was generated in a large amount in the bottom of glass container immediately after the ink had melted.

(3) Initial Introduction Test

Each of the obtained inks was contained in a pressure-proof glass container. The inside of each of the containers was vacuumized by using a vacuum pump while being irradiated with ultrasonic wave, and the gas contained in each of the inks was degassed. The degassed inks were respectively used for conducting the initial introduction test in which an ink-jet printer MFC3100C produced by Brother Kogyo Kabushiki Kaisha was used for evaluation. Namely, with respect to each of the inks, a purge operation (suction of ink with a pump in the printer main body) was performed for three times after the ink cartridge had been exchanged. Immediately after the purge operation, a printing test was conducted. The ratio of nozzles which were able to discharge the inks (discharge nozzles) to the total number of the nozzles was calculated in order to make an evaluation in accordance with the following criteria:

++: Ratio of the discharge nozzles to the total number of nozzles was 100%;

+: Ratio of the discharge nozzles to the total number of nozzles was not less than 90%;

±: Ratio of the discharge nozzles to the total number of nozzles was not less than 80%; and −: Ratio of the discharge nozzles to the total number of nozzles was less than 80%.

(4) Evaluation of Bleeding

The inks (yellow inks) obtained in Examples 1 to 9 and Comparative Examples 1 to 7, respectively, were subjected to the evaluation of bleeding in accordance with the following methods. Namely, the obtained yellow inks for ink-jet recording were respectively combined with the black ink having the composition indicated in Table 3 to perform printing of an image sample on a recording paper (regular paper, XEROX 4200) by using an ink-jet printer (MFC-3100C produced by Brother Industries, Ltd.). The sample image was composed of a portion including letters and background in which colors were combined so that the letters and background are printed with the black and yellow inks, respectively, and a portion including only the letters without any background. As for the size of the recorded letters, the letter size was set to 11 Point. The evaluation was directed to the extent of blurring at the boundary portion between the yellow and black inks in which the inks are mixed with each other, and the distinction of the recorded letters with the background as compared with the recorded letters without any background. The observation was made visually to determine the extent of blurring of the letters with the background as compared with the letters without any background in accordance with the following criteria.

+: The blurring is slightly caused in the letters with the background as compared with the letters without any background, but the letters are sufficiently readable or distinguishable.

−: The blurring is caused considerably in the letters with the background as compared with the letters without the background, and the letters are indistinct as well.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Glycerol |  | 22 | 22 | 22 | 22 | 30 |  | 20 | 22 |  |
| (B) | dipropylene glycol mono propyl ether | 1 |  | 1 | 1 |  |  |  |  | 1 |
|  | diethylene glycol mono butyl ether |  | 0.6 |  |  | 0.5 | 1 |  |  |  |

TABLE 1-continued

|  |  | Example 1 | Example 2 | Example 3 | Example 4 | Example 5 | Example 6 | Example 7 | Example 8 | Example 9 |
|---|---|---|---|---|---|---|---|---|---|---|
|  | triethylene glycol mono butyl ether |  |  |  |  |  |  | 3 |  | 7 |
| (C) | diethylene glycol | 11 |  | 5.5 |  | 7.5 |  |  |  |  |
|  | triethylene glycol |  | 11 |  |  |  | 10 |  |  | 18 |
|  | polyethylene glycol #200 |  |  | 5.5 | 11 |  |  | 11 |  |  |
|  | N-methyl-2-pyrrolidone |  |  |  |  |  |  |  | 11 |  |
| Surfactant represented by the formula (1) |  | 0.2 | 0.2 | 0.1 |  | 0.2 | 0.2 |  | 0.2 | 0.2 |
| C.I. Direct Yellow 132 |  | 2.5 | 2 | 2.5 | 0.2 | 2.5 | 2.5 | 2.5 | 2.5 | 3.5 |
| C.I. Direct Blue 199 |  |  |  |  | 2.5 |  |  |  |  |  |
| Pure Water |  | balance | balance | balance | balance | balance | balance | balance | balance | balance |
| B/A |  | 0.4 | 0.3 | 0.4 | 5.0 | 0.2 | 0.4 | 1.2 | 0.4 | 2.0 |
| C/A |  | 4.4 | 5.5 | 4.4 | 55.0 | 3.0 | 4.0 | 4.4 | 4.4 | 5.1 |
| Dye deposition after evaporation test |  | ++ | ++ | ++ | ++ | + | ++ | ++ | ++ | ++ |
| Dye deposition after preservation at low-temperature |  | ++ | ++ | ++ | ++ | + | ++ | ++ | ++ | ++ |
| Initial introduction test |  | ++ | ++ | ++ | + | ++ | ++ | + | ++ | ++ |
| Evaluation of bleeding |  | + | + | + | + | + | + | + | + | + |

TABLE 2

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Glycerol |  | 30 | 22 | 20 | 22 | 22 | 10 | 10 |
| (B) | dipropylene glycol mono propyl ether |  |  |  | 1 |  |  | 1 |
|  | diethylene glycol mono butyl ether |  |  | 1 |  |  |  |  |
|  | triethylene glycol mono butyl ether |  | 0.3 |  |  |  | 12 |  |
| (C) | diethylene glycol |  |  | 5 |  |  | 11 | 42 |
|  | triethylene glycol |  |  |  |  | 10 |  |  |
|  | polyethylene glycol #200 |  | 11 |  |  |  |  |  |
| ethylene glycol monophenyl ether |  |  |  |  |  | 1 |  |  |
| ethylene glycol |  |  |  |  | 11 |  |  |  |
| Surfactant represented by the formula (1) |  |  |  | 0.2 | 0.1 |  | 0.2 |  |
| Surfactant represented by the formula (2) |  |  |  |  |  | 0.2 |  |  |
| C.I. Direct Yellow 132 |  | 1.5 | 2.5 | 2.5 | 2.5 | 2.5 | 2 | 0.5 |
| C.I. Direct Blue 199 |  |  |  |  |  |  |  | 2 |
| Pure Water |  | balance | balance | balance | balance | balance | balance | balance |
| B/A |  | 0.0 | 0.1 | 0.4 | 0.4 | 0.0 | 6.0 | 2.0 |
| C/A |  | 0.0 | 4.4 | 2.0 | 0.0 | 4.0 | 5.5 | 84.0 |
| Dye deposition after evaporation test |  | − | + | − | − | + | ++ | ++ |

TABLE 2-continued

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Dye deposition after preservation at low-temperature | − | − | ± | ± | − | ++ | ++ |
| Initial introduction test | − | − | ++ | + | ± | ++ | ++ |
| Evaluation of bleeding | + | + | + | + | + | − | − |

TABLE 3

| | Black Ink |
|---|---|
| CAB-O-JET 300 (produced by Cabot) | 35.00 |
| glycerol | 21.50 |
| dipropylene glycol monopropyl ether | 1.00 |
| Surfactant represented by the formula (1) | 0.10 |
| pure water | balance |
| Total | 100.00 |

From the results indicated in Tables 1 and 2, it is appreciated that the inks prepared in Examples 1 to 9, respectively, are satisfactory in all of (1) Dye deposition test after evaporation test, (2) Dye deposition test after preservation at low-temperature, (3) Initial introduction test, and (4) Evaluation of bleeding. In particular, when B/A is not less than 0.3, no deposition of the solid matter from the ink was generated in the dye deposition test after preservation at low-temperature; and when C/A is not less than 4, no deposition of the solid matter from the ink was generated in the dye deposition test after evaporation test. Accordingly, satisfactory results were obtained. On the other hand, regarding the inks prepared in Comparative Examples 1-7 respectively, it is appreciated that the inks prepared in Comparative Examples 1, 2 and 5 respectively, in which B/A is less than 0.2, were inferior in the result of the dye deposition test after preservation at low-temperature. The inks prepared in Comparative Examples 1, 3 and 4 respectively, in which C/A is less than 3, were inferior in the result of the dye deposition test after evaporation test. Further, the inks prepared in Comparative Examples 6 and 7, in which the content of the glycol ether in the ink exceeds 10% by weight and the content of the water-soluble organic solvent in the ink exceeds 40% by weight, respectively, were inferior in the result of the evaluation of bleeding. Accordingly, it was confirmed that the inks prepared in the Examples of the present invention did not generate any foreign matters such as dye after the evaporation of water or at low temperatures, thereby achieving the stability in long-term storage, and the bleeding is suppressed.

In addition, by comparing Examples 4 and 7 with the remaining Examples, it is appreciated that the result of the initial introduction test can be improved by adding the surfactant represented by the formula (1).

The ink of the present invention is effective as a water-base ink for ink-jet recording which contains C.I. Direct Yellow 132 as the coloring agent and which is excellent in the stability in long-term storage. In particular, the ink of the present invention ensures the stable use of the ink containing C.I. Direct Yellow 132 regardless of the environments in which the ink-jet recording apparatus is used such as the high-temperature, dry or cold areas or the change in temperature during the transportation of the ink.

What is claimed is:

1. A water base ink for ink-jet recording comprising:
   C.I. Direct Yellow 132 in an amount of 0.1% by weight to 4.0% by weight;
   glycol ether having a melting point of not more than −45° C. in an amount of not less than 0.5% by weight; and
   a water-soluble organic solvent in which a solubility of the C.I. Direct Yellow 132 at 20° C. is not less than 5%,
   wherein the ink satisfies the following formulae:

$0.2 \leq B/A$, and $3 \leq C/A$ in which B/A represents a weight ratio of the glycol ether to the C.I. Direct Yellow 132 contained in the ink, and C/A represents a weight ratio of the water-soluble organic solvent to the C.I. Direct Yellow 132 contained in the ink, and
   wherein the ink further comprises a surfactant represented by the following formula:

$C_xH_{2x+1}$—O—$(CH_2CH_2O)_3$–$SO_3Na$ in which x is 12 or 13.

2. The ink according to claim 1, wherein the glycol ether is contained in the ink in an amount of not more than 10% by weight, and the water-soluble organic solvent is contained in the ink in an amount of not more than 40% by weight.

3. The ink according to claim 1, wherein the following formulae are satisfied:

$0.2 \leq B/A \leq 5$, and $3 \leq C/A \leq 60$.

4. The ink according to claim 3, wherein the following formula is satisfied:

$3 \leq C/A \leq 55$.

5. The ink according to claim 1, wherein $B/A \geq 0.3$ and $C/A \geq 4$.

6. The ink according to claim 1, wherein a solubility of the C.I. Direct Yellow 132 at −20° C. in the water-soluble organic solvent is not less than 5%.

7. The ink according to claim 1, wherein a viscosity of the ink is 2 to 5 mPas.

8. The ink according to claim 1, wherein the surfactant is contained in the ink in an amount of 0.01 to 2% by weight.

9. The ink according to claim 1, wherein the glycol ether is at least one selected from the group consisting of triethylene glycol monobutyl ether, dipropylene glycol monopropyl ether and diethylene glycol monobutyl ether.

10. The ink according to claim 6, wherein the water-soluble organic solvent is at least one selected from the group consisting of diethylene glycol, triethylene glycol, polyethylene glycol #200 and N-methyl-2-pyrrolidone.

11. The ink according to claim 1, further comprising a different dye from the C.I. Direct Yellow 132.

12. The ink according to claim 1, further comprising glycerol.

* * * * *